(12) United States Patent
Takahashi et al.

(10) Patent No.: US 11,007,480 B2
(45) Date of Patent: May 18, 2021

(54) EXHAUST GAS PURIFICATION SYSTEM

(71) Applicant: HITACHI AUTOMOTIVE SYSTEMS, LTD., Hitachinaka (JP)

(72) Inventors: Eri Takahashi, Tokyo (JP); Masato Kaneeda, Tokyo (JP); Kazuhiro Oryoji, Tokyo (JP); Naoki Yoneya, Tokyo (JP); Masayuki Saruwatari, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 49 days.

(21) Appl. No.: 16/489,008

(22) PCT Filed: Feb. 5, 2018

(86) PCT No.: PCT/JP2018/003740
§ 371 (c)(1),
(2) Date: Aug. 27, 2019

(87) PCT Pub. No.: WO2018/179836
PCT Pub. Date: Oct. 4, 2018

(65) Prior Publication Data
US 2020/0001236 A1    Jan. 2, 2020

(30) Foreign Application Priority Data
Mar. 30, 2017    (JP) .............................. JP2017-066628

(51) Int. Cl.
*B01D 53/84*    (2006.01)
*B01D 53/86*    (2006.01)
(Continued)

(52) U.S. Cl.
CPC .............. *B01D 53/94* (2013.01); *B01J 23/08* (2013.01); *B01D 53/86* (2013.01); *F01N 3/08* (2013.01); *F02D 13/06* (2013.01); *F02D 41/04* (2013.01)

(58) Field of Classification Search
CPC . F01N 3/08; F02D 13/06; F02D 41/04; B01D 53/94; B01D 53/86; B01J 23/08
(Continued)

(56) References Cited

U.S. PATENT DOCUMENTS 5,173,278 A * 12/1992 Marler ............... B01D 53/8625
423/239.2
6,348,430 B1 * 2/2002 Lindner ............... B01D 53/945
502/304
(Continued)

FOREIGN PATENT DOCUMENTS

EP    0498325 A1 *  8/1992  ............. B01J 23/08
JP    06-093839 A    4/1994
(Continued)

OTHER PUBLICATIONS

An English Machine Translation copy to Ito Minoru (Pub. No. JP 2013-217266 A), published on Oct. 24, 2013. <br>.*
(Continued)

*Primary Examiner* — Thai Ba Trieu
(74) *Attorney, Agent, or Firm* — Volpe Koenig

(57) ABSTRACT

An object of the present invention is to provide an exhaust gas purification system which exhibits high exhaust gas purification performance. The present invention provides an exhaust gas purification system including: a carrier containing aluminum oxide; an exhaust gas purification device including a catalyst provided on the carrier and containing gallium, and connected to an internal combustion engine; and a system connected to the exhaust gas purification
(Continued)

device for increasing an oxygen concentration. The system for increasing an oxygen concentration provides an oxygen concentration higher than that of a post combusted gas of the internal combustion engine.

10 Claims, 7 Drawing Sheets

(51) Int. Cl.
*F01N 3/08* (2006.01)
*B01J 23/08* (2006.01)
*F02D 13/06* (2006.01)
*F02D 41/04* (2006.01)
*B01D 53/94* (2006.01)

(58) Field of Classification Search
USPC .......................................................... 60/299
See application file for complete search history.

(56) References Cited

U.S. PATENT DOCUMENTS

| | | | | |
|---|---|---|---|---|
| 7,767,175 B2 * | 8/2010 | Golden | ............. | B01D 53/9418 423/213.2 |
| 2003/0118960 A1 * | 6/2003 | Balmer-Millar | ... | B01D 53/9418 431/146 |
| 2009/0270640 A1 * | 10/2009 | Maurer | ................ | C07D 301/10 549/523 |

FOREIGN PATENT DOCUMENTS

| | | |
|---|---|---|
| JP | 07-178338 A | 7/1995 |
| JP | 2001-170488 A | 6/2001 |
| JP | 2003-336538 A | 11/2003 |
| JP | 2006-200414 A | 8/2006 |
| JP | 2007-154722 A | 6/2007 |
| JP | 2008-163887 A | 7/2008 |
| JP | 2013-217266 A | 10/2013 |
| WO | 2017/006669 A1 | 1/2017 |

OTHER PUBLICATIONS

An English Machine Translation copy to Hlrata Hiroto et al. (Pub. No. JP 2008-163887 A), published on Jul. 17, 2008.*
An English Machine Translation copy to Aoyama Taro (Pub. No. JP 2007-154722 A), published on Jun. 21, 2007.*
An English Machine Translation copy to Miura So (Pub. No. JP 2006-200414 A), published on Aug. 3, 2006.*
An English Machine Translation copy to Tanaka Toshikazu et al. (Pub. No. JP 2003-336538 A), published on Nov. 28, 2003.*
An English Machine Translation copy to Hatano Masaharu et al. (Pub. No. JP 2001-170488 A), published on Jun. 26, 2001.*
An English Machine Translation copy to Kagatsume Akiko et al. (Pub. No. WO 2017/006669 A1), published on Jan. 12, 2017.*
International Search Report, PCT/JP2018/003740, dated Jun. 5, 2018, 2 pgs.
Japanese Office Action dated Dec. 8, 2020 for Japanese Patent Application No. 2017-066628.

* cited by examiner

EXHAUST GAS PURIFICATION SYSTEM

TECHNICAL FIELD

The present invention relates to a novel exhaust gas purification system suitable for purifying NOx contained in a lean burn exhaust gas in an internal combustion engine operated in a lean burn state where fuel is leaner than a theoretical air-fuel ratio.

BACKGROUND ART

In recent years, a lean burn engine having an air-fuel ratio providing lean fuel has drawn attention. Here, the air-fuel ratio represents a ratio of air to fuel in a gas. A three-way catalyst conventionally used for purifying an exhaust gas of a theoretical air-fuel ratio (stoichiometric) engine makes it difficult to purify NOx in an exhaust gas of the lean burn engine. Therefore, an exhaust gas purification catalyst for lean burn engines has been examined.

As the exhaust gas purification catalyst for lean burn engines, a catalyst in which gallium is supported on a metal oxide carrier is known to have NOx purification performance even in an oxygen excess atmosphere.

PTL 1 states that the use of a catalyst containing gallium and a refractory oxide (alumina, titania, magnesia, zirconia, and the like) makes it possible to reduce and remove NOx in an oxidizing atmosphere.

In PTL 2, the use of a catalyst containing rhodium and aluminum and containing one or more of gallium and zirconium provides improved durability of the catalyst to SOx.

The lean burn engine has an air-fuel ratio providing lean fuel, that is, increases the proportion of air to increase an oxygen concentration, thereby improving fuel efficiency. This requires an exhaust gas purification catalyst capable of maintaining the NOx purification performance even if the oxygen concentration is increased.

CITATION LIST

Patent Literature

PTL 1: JP 7-178338 A
PTL 2: JP 2001-170488 A

SUMMARY OF INVENTION

Technical Problem

PTL 1 and PTL 2 describe the NOx purification performance in an oxygen excess atmosphere. However, PTL 1 and PTL 2 do not examine the influence of the fluctuation of the oxygen concentration, and the influence of the fluctuation of the oxygen concentration on the catalyst performance is unknown.

An object of the present invention is to include a system for increasing the concentration of oxygen flowing into an exhaust gas purification catalyst to improve the exhaust gas purification performance of the catalyst and to stably maintain high exhaust gas purification performance.

Solution to Problem

In order to achieve the above object, the present invention provides an exhaust gas purification system including: a carrier containing aluminum oxide; an exhaust gas purification device including a catalyst provided on the carrier and containing gallium, and connected to an internal combustion engine; and a system for increasing an oxygen concentration, the system being connected to the exhaust gas purification device. The system for increasing an oxygen concentration provides an oxygen concentration higher than that of a post combusted gas of the internal combustion engine.

Advantageous Effects of Invention

The present invention can purify a harmful substance, in particular, NOx with high efficiency regardless of the oxygen concentration of a post combusted gas of an internal combustion engine.

DESCRIPTION OF EMBODIMENTS

Figure 1:
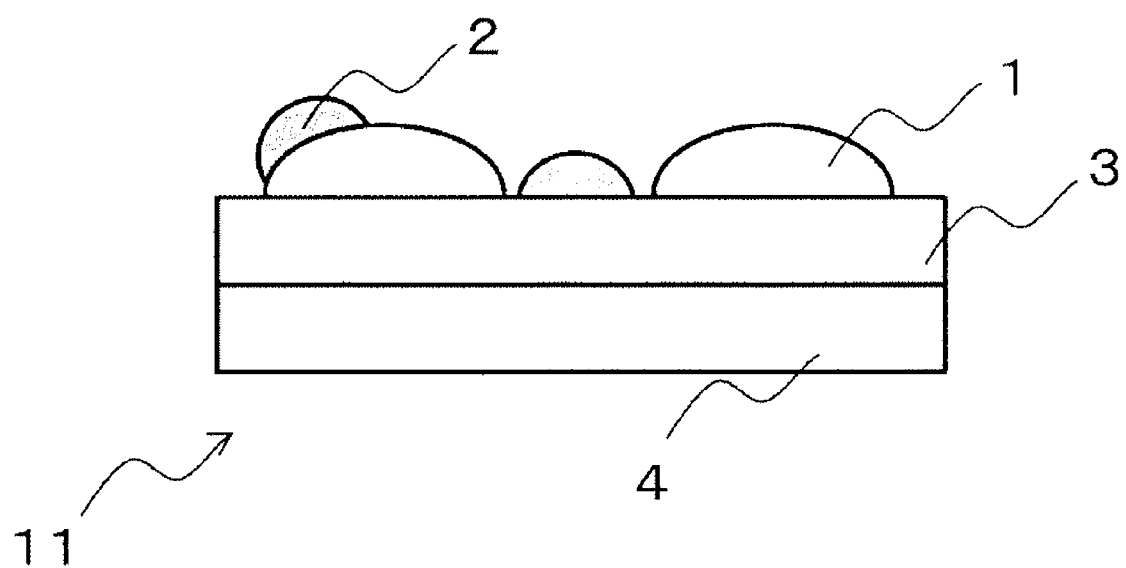
FIG. 1 is a diagram showing a state of a carrier and a catalytically active component on the surface of an exhaust gas purification catalyst.

FIG. 1 is a conceptual view showing the structure of an exhaust gas purification catalyst 11 in the present invention.

The exhaust gas purification catalyst 11 which can be used is obtained by coating a carrier 3 containing aluminum oxide ($Al_2O_3$) on a substrate 4 having a honeycomb structure and supporting a first catalyst 1 containing at least gallium (Ga) on the carrier 3. Furthermore, a second catalyst 2 containing at least rhodium (Rh) may be supported.

Although described in detail below, the oxygen ($O_2$) concentration of an exhaust gas flowing into the exhaust gas purification catalyst 11 in the present invention is increased, whereby the exhaust gas can be highly purified.

It is considered that a NOx purification reaction provided by the exhaust gas purification catalyst 11 proceeds according to the following mechanism. First, NO and a hydrocarbon which is a reducing agent are adsorbed to the first catalyst 1 and the second catalyst 2. NO is oxidized to $NO_2$ by $O_2$ as in Formula (1), and then reacted with a hydrocarbon as in Formula (2) to be desorbed as $N_2$, $CO_2$, and $H_2O$.

However, in a lean state, the exhaust gas contains a large quantity of $O_2$, whereby the oxidation (combustion reaction) of the hydrocarbon provided by $O_2$ simultaneously proceeds as in Formula (3).

(1) $NO + O_2 \rightarrow NO_2$             Formula (1)

(2) $NO_2 + \text{hydrocarbon} \rightarrow N_2 + CO_2 + H_2O$     Formula (2)

(3) $\text{hydrocarbon} + O_2 \rightarrow CO_2 + H_2O$     Formula (3)

Therefore, it is considered that, if the reaction of Formula (3) is more promoted as compared with the reaction of Formula (2), the purification rate of $NO_x$ can be increased. This makes it important to promote the reaction of Formula (1).

In order to promote the reaction of Formula (1) much preferentially over the reaction of Formula (3), the first catalyst 1 preferably contains Ga. The quantity of a first catalyst element is preferably within a range of 0.5 to 20% by weight with respect to $Al_2O_3$ contained in the carrier 3. (Here, % by weight represents the content ratio of each component in terms of gram. For example, 0.5% by weight of the supported quantity of component B with respect to a component A means that the component B is supported at a ratio of 0.5 with respect to 100 of the component A in terms of gram regardless of a certain degree of the absolute quantity of component A). When the quantity of first catalyst element is less than 0.5% by weight, the reactions of Formulae (1) and (2) are less likely to proceed, so that NOx may not be sufficiently purified. Even when the quantity is more than 20% by weight, the surface exposure area of the first catalyst element decreases, or the coating of the first catalyst element on a second catalyst element occurs, so that catalytic activity may not be sufficiently exhibited.

The quantity of the second catalyst element is preferably 2% by weight or less with respect to $Al_2O_3$ contained in the carrier 3. When the quantity is more than 2% by weight, Formula (3) proceeds much preferentially over Formula (2), so that NOx may not be sufficiently purified.

When a portion in which, with respect to $Al_2O_3$ contained in the carrier 3, the quantity of first catalyst element is 0.5 to 20% by weight, and the quantity of second catalyst element is 2% by weight or less is present even in a part of the exhaust gas purification catalyst 11, the above effect can be efficiently exhibited. For example, the following cases (1) and (2) can be considered as an exemplary form of the catalyst. (1) Plate-like or granular $Al_2O_3$ as a layer not containing the first catalyst 1 and the second catalyst 2 is present on the substrate 4. Furthermore, the carrier 3 containing the first catalyst 1 and the second catalyst 2 is present thereon. (2) The carrier 3 containing the first catalyst 1 and the second catalyst 2 is present on the surface of granular $Al_2O_3$ not containing the first catalyst 1 and the second catalyst 2. In any of the cases (1) and (2), a portion is preferably present, in which, with respect to $Al_2O_3$ contained in the carrier 3 containing the first catalyst 1 and the second catalyst 2, the quantity of first catalyst element is 0.5 to 20% by weight, and the quantity of second catalyst element is 2% by weight or less.

The first catalyst 1 and the second catalyst 2 are preferably in contact with the carrier 3 containing $Al_2O_3$, and the first catalyst 1 and the second catalyst 2 are preferably provided on the surface of the carrier 3 containing $Al_2O_3$.

As the second catalyst element, metals such as Ce, Ti, V, Cr, Mn, Fe, Co, Ni, Cu, Zn, Zr, Mo, Ru, Pd, Ag, Ce, W, Ir, and Au can be used in addition to Rh. Meanwhile, when Pt is used, NOx may be converted to $N_2O$, which may cause a substantially decreased NOx purification rate.

In addition to Ga and Rh, other transition metals can also be added as a catalytically active component. As the other transition metals, particularly, Fe, Co, Ni, Pd, Ag, and Au and the like are suitable. These metals promote the oxidation of NO to $NO_2$ and the adsorption of the hydrocarbon, whereby the exhaust gas purification performance can be improved.

The carrier 3 is considered to play a role in enhancing the dispersibility of the catalytically active component. The carrier 3 may be supported on the substrate 4. In this case, the supported quantity of the carrier 3 with respect to 1 L of the substrate 4 is preferably 30 g or more and 400 g or less for the exhaust gas purification performance. When the supported quantity of the carrier 3 is less than 30 g, the effect of the carrier 3 is insufficient. When the supported quantity is more than 400 g, the specific surface area of the carrier 3 itself is reduced, which is not preferable.

The carrier 3 contains $Al_2O_3$, but the specific surface area of $Al_2O_3$ is preferably 100 to 300 $m^2/g$ for the exhaust gas purification performance. The particle size of $Al_2O_3$ is preferably 1 to 25 μm for the exhaust gas purification performance.

As the carrier 3, $Al_2O_3$ is most preferable, but in addition, metal oxides and composite oxides such as $TiO_2$, $SiO_2$, $SiO_2$—$Al_2O_3$, $ZrO_2$, MgO, CoO, NiO, and CuO can also be used. The reason why $Al_2O_3$ is most preferable is considered to be that Ga—O—Al is formed by supporting the first catalyst 1 containing Ga, and this serves as a catalyst active point. The carrier 3 to which zeolite such as β-zeolite, mordenite, ferrierite, or Y-type zeolite is added can be used.

The exhaust gas purification catalyst 11 may be obtained by coating the carrier 3 on the substrate 4 having a honeycomb structure and the like, and thereafter supporting the catalytically active component, or coating the carrier 3 supporting the catalytically active component on the substrate 4. The substrate 4 is most suitably cordierite, but the use of a substrate made of a metal can provide good results.

The exhaust gas purification catalyst 11 which can be applied has various shapes according to the applications. A honeycomb shape, a pellet shape, a plate shape, a particle shape, and a powder shape and the like can be applied. The honeycomb shape is obtained by coating a catalyst powder supporting various components on a honeycomb structure made of various materials such as cordierite and stainless steel.

As a method for preparing the exhaust gas purification catalyst 11, any of physical preparation methods such as an impregnation method, a kneading method, a coprecipitation method, a sol-gel method, an ion exchange method, and a vapor deposition method, and preparation methods using a chemical reaction can be applied. As the starting material of the exhaust gas purification catalyst 11, various compounds such as a nitric acid compound, an acetic acid compound, a complex compound, a hydroxide, a carbonic acid compound, and an organic compound, metals, and metal oxides can be used.

Figure 2:
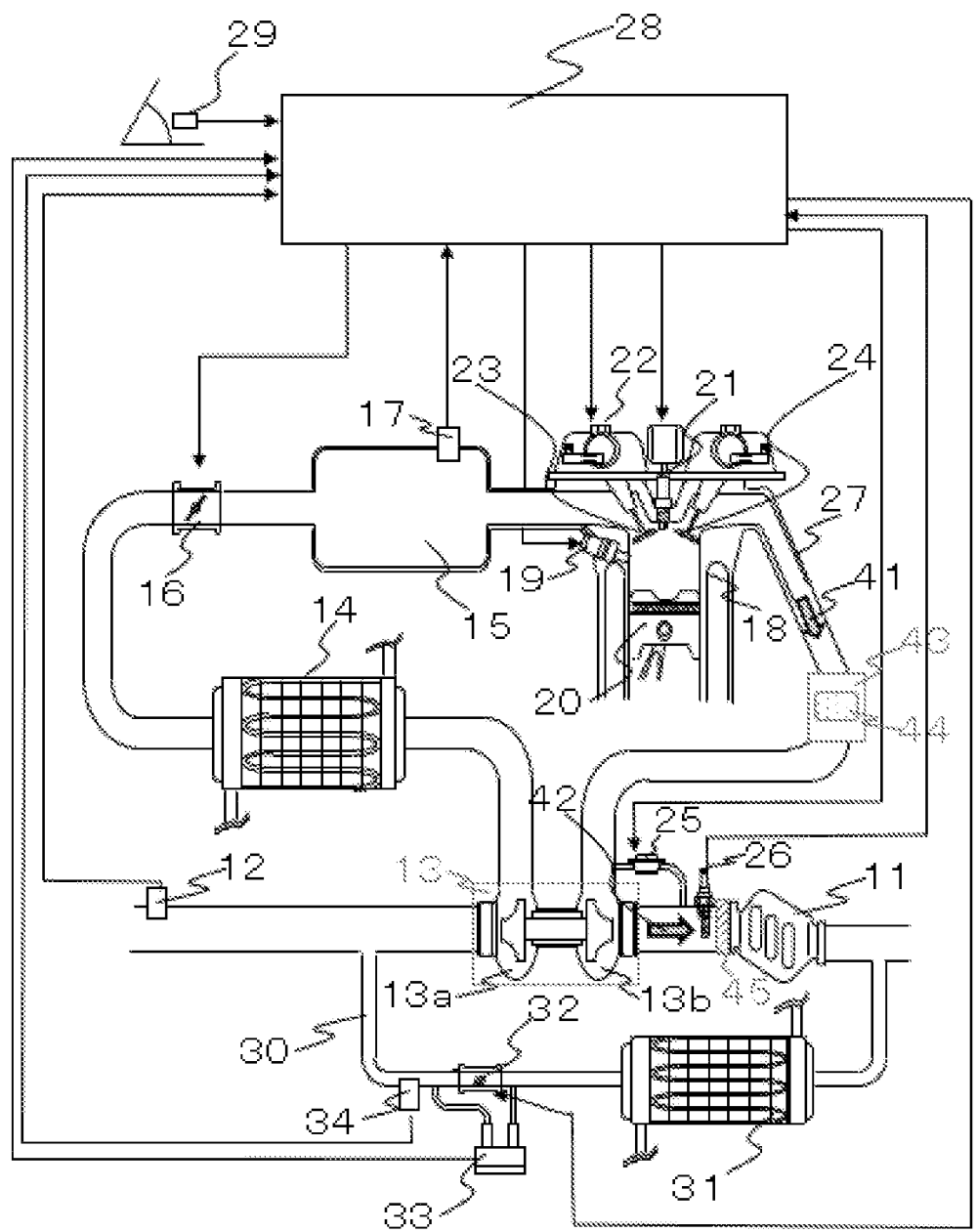
FIG. 2 is a diagram showing an example of an engine system.

FIG. 2 is a diagram showing an example of an engine system including the exhaust gas purification catalyst 11. An engine includes an air flow sensor 12 for measuring an amount of intake air, a compressor 13a of a supercharger 13 for supercharging the intake air, an intercooler 14 for cooling the intake air, an intake pipe 15 including an intake pressure sensor 17 for measuring a pressure in the intake pipe 15, and an electronically controlled throttle 16 for adjusting the pressure in the intake pipe 15.

For each cylinder engine, the engine includes a fuel injection device (hereinafter, referred to as an injector) 19, a piston 20 for compressing an air-fuel mixture of injected fuel and air, and an ignition plug 21 for supplying ignition energy. The fuel may be injected into a cylinder 18 of each cylinder engine, or may be injected into the intake pipe 15. However, FIG. 2 is a diagram assuming fuel injection into the cylinder 18.

A valve timing mechanism 22 is provided in a cylinder head to adjust a gas flowing into the cylinder and out of the cylinder. An intake amount and an internal EGR amount can be adjusted by adjusting the opening and closing timings of intake valves 23 and exhaust valves 24 of all the cylinder engines by the valve timing mechanism 22. As the valve timing mechanism 22, a variable valve timing mechanism, a variable valve lift mechanism, and a camshaft switching mechanism and the like can be used.

A high pressure fuel pump for supplying high pressure fuel is connected to an injector 19 by a fuel pipe, and a fuel pressure sensor for measuring a fuel injection pressure is included in the fuel pipe.

Furthermore, a turbine 13b for applying a rotational force to the compressor 13a of the supercharger 13 by exhaust energy, an electronically controlled wastegate valve 25 for adjusting a flow rate of exhaust flowing into the turbine 13b, an exhaust gas purification catalyst 11 for purifying the exhaust, and an air-fuel ratio sensor 26 which is an aspect of an air-fuel ratio detector and detects the air-fuel ratio of the exhaust on the upstream side of the exhaust gas purification catalyst 11 are provided in an exhaust pipe 27. A crankshaft includes a crank angle sensor for calculating a rotation angle.

The engine may include an EGR pipe 30 for returning the exhaust from the downstream side of the exhaust gas purification catalyst 11 to the upstream side of the compressor 13a. An EGR cooler 31 for cooling EGR, an EGR valve 32 for controlling an EGR flow rate, a differential pressure sensor 33 for detecting a differential pressure across the EGR valve, and an EGR temperature sensor 34 for detecting an EGR temperature are attached to appropriate positions of the EGR pipe 30.

Signals obtained from the air flow sensor 12, the air-fuel ratio sensor 26, the intake pressure sensor 17, the differential pressure sensor 33, and the EGR temperature sensor 34 are sent to an engine control unit (ECU) 28. A signal obtained from an accelerator opening sensor 29 is also sent to the ECU 28. The accelerator opening sensor 29 detects a depression amount of an accelerator pedal, that is, an accelerator opening. The ECU 28 operates required torque based on an output signal of the accelerator opening sensor 29. That is, the accelerator opening sensor 29 is used as a required torque detection sensor to detect the required torque to the engine. The ECU 28 operates a rotational speed of the engine based on an output signal of the crank angle sensor. The ECU 28 optimally operates main operation amounts of the engine such as an air flow rate, a fuel injection amount, an ignition timing, and a fuel pressure based on an operating state of the engine obtained from the outputs of the various sensors.

The fuel injection amount operated by the ECU 28 is converted to a valve opening pulse signal, and is sent to the injector 19. An ignition signal is sent to the ignition plug 21 to be ignited at the ignition timing operated by the ECU 28. A throttle opening operated by the ECU 28 is sent as a throttle drive signal to the electronically controlled throttle 16. A valve timing operation amount operated by the ECU 28 is sent as a valve timing drive signal to the valve timing mechanism 22. A wastegate valve opening operated by the ECU 28 is sent as a wastegate valve drive signal to the wastegate valve 25. An EGR valve opening constantly operated by the ECU 28 is sent as an EGR valve opening drive signal to the EGR valve 32.

The fuel is injected into the air flowing into the cylinder 18 from the intake pipe 15 via the intake valve 23 to form an air-fuel mixture. The air-fuel mixture combusts due to sparks generated from the ignition plug 21 at a predetermined ignition timing, and the combustion pressure pushes down the piston 20 to generate a drive force of the engine. Furthermore, after a post combusted gas 41 is sent to the exhaust gas purification catalyst 11 via the exhaust pipe 27, the post combusted gas 41 is purified in the exhaust gas purification catalyst 11, and is discharged to the outside.

The exhaust gas purification catalyst 11 of the present invention can also be used for purifying an exhaust gas of a theoretical air-fuel ratio (stoichiometric) engine, and for purifying an exhaust gas of a lean burn engine operated at an air-fuel ratio (14.7 or more) leaner than the theoretical air-fuel ratio. The exhaust gas purification catalyst 11 and a three-way catalyst may be used in combination.

In order to improve the exhaust gas purification activity of the exhaust gas purification catalyst 11 of the present invention, the reaction of Formula (1) may be promoted. For that purpose, the $O_2$ concentration of the exhaust gas flowing into the exhaust gas purification catalyst 11 (hereinafter, a catalyst inflow gas 42) is preferably increased.

Hereinafter, an example of a method for increasing the $O_2$ concentration of the catalyst inflow gas 42 will be described.

The $O_2$ concentration of the catalyst inflow gas 42 is preferably 0.5% by volume or more with respect to the entire exhaust gas for the exhaust gas purification performance. When the $O_2$ concentration is less than 0.5% by volume, the reaction of Formula (1) is less likely to proceed, so that NOx may not be sufficiently purified according to Formula (2).

In order to increase the $O_2$ concentration of the catalyst inflow gas 42, the $O_2$ concentration of the air-fuel mixture of fuel and air introduced into the cylinder 18 of each cylinder engine may be increased, or the $O_2$ concentration of the catalyst inflow gas 42 may be set to be higher than the $O_2$ concentration of the post combusted gas 41.

The air flow rate and the fuel injection amount and the like are controlled by the ECU 28 so as to increase the air-fuel ratio, whereby the ratio of air in the air-fuel mixture of fuel and air introduced into the cylinder 18, that is, the $O_2$ concentration can be increased. Therefore, the $O_2$ concentration of the catalyst inflow gas 42 is increased as the air-fuel ratio is increased.

When a plurality of cylinder engines are present, air is introduced into cylinders 18 of some cylinder engines in place of the air-fuel mixture of fuel and air, whereby the air is discharged to the exhaust pipe 27 connected to the cylinder engines. Therefore, the post combusted gas 41 discharged from the cylinder engine in which fuel and air are introduced into the cylinder 18 and combust, and the air discharged from the cylinder engine in which the air is introduced into the cylinder are mixed in the exhaust pipe 27, whereby a gas having a higher proportion of the air than that of only the post combusted gas 41, that is, a higher $O_2$ concentration can be supplied to the exhaust gas purification catalyst 11 as the catalyst inflow gas 42.

Even if the intake valve 23 and the exhaust valve 24 are simultaneously opened to circulate the air when the air is introduced into the cylinder 18, the exhaust valve 24 may be opened to discharge the air to the exhaust pipe 27 after only the intake valve 23 is opened to introduce the air into the cylinder 18.

When the variable valve timing mechanism is used as the valve timing mechanism 22, the post combusted gas 41 discharged from the cylinder engine in which the air-fuel mixture of fuel and air is introduced into the cylinder 18 and combusts, and the air discharged from the cylinder engine in which the air is introduced into the cylinder 18 can be adjusted to be simultaneously discharged to the exhaust pipe 27. Therefore, the post combusted gas 41 and the air are easily mixed.

Figure 3:
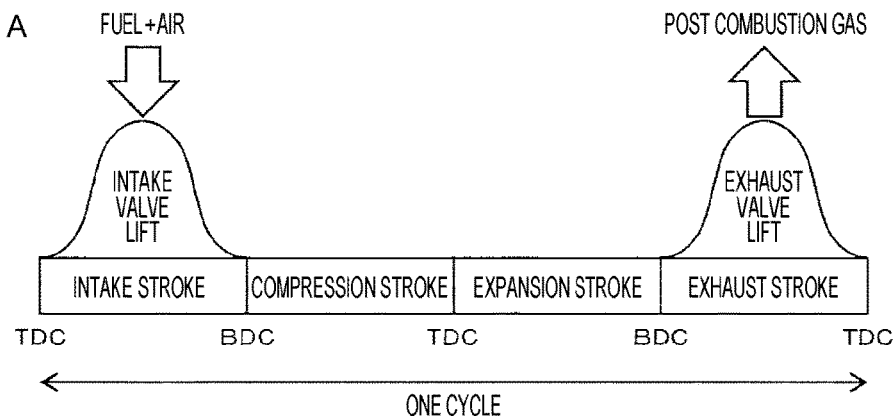
FIG. 3 is a diagram showing an example of the relationship between each of strokes and each of intake and exhaust timings in an engine system in which exhaust strokes of engine cylinders discharging a post combusted gas and air are simultaneously performed.
Figure 3:
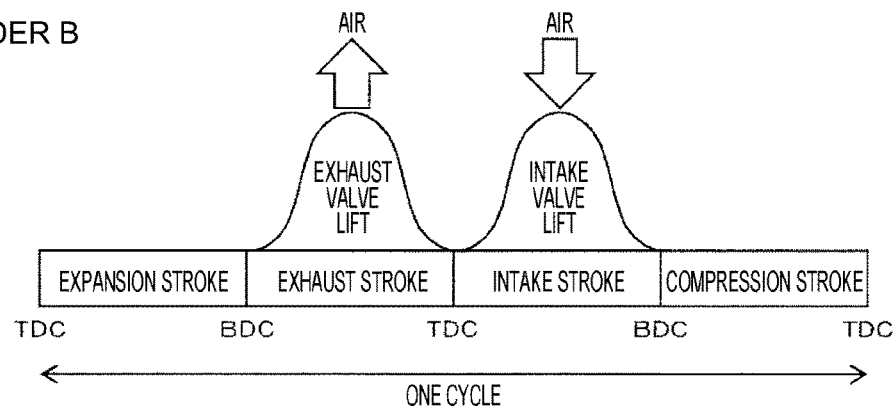
Figure 3:
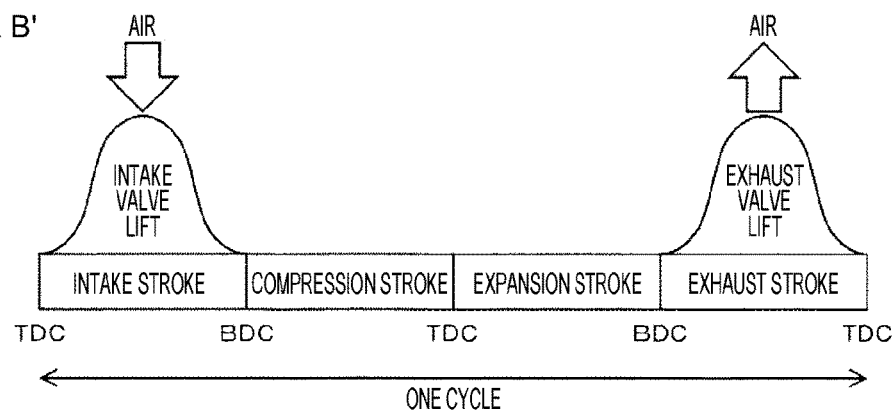

FIG. 3 is a diagram showing an example of the relationship between each of strokes and each of intake and exhaust timings when exhaust strokes of engine cylinders for discharging a post combusted gas and air are simultaneously performed. When the air-fuel mixture of fuel and air is introduced into the cylinder 18 of an engine cylinder A, the post combusted gas 41 is discharged in the exhaust stroke. At this time, if the intake and exhaust timings of an engine cylinder B are changed as in a engine cylinder B' to introduce only air into the cylinder 18, the post combusted gas 41 discharged in the exhaust stroke of the engine cylinder A and the air discharged in the exhaust stroke of the engine cylinder B' are simultaneously discharged to the exhaust pipe 27.

Figure 4:
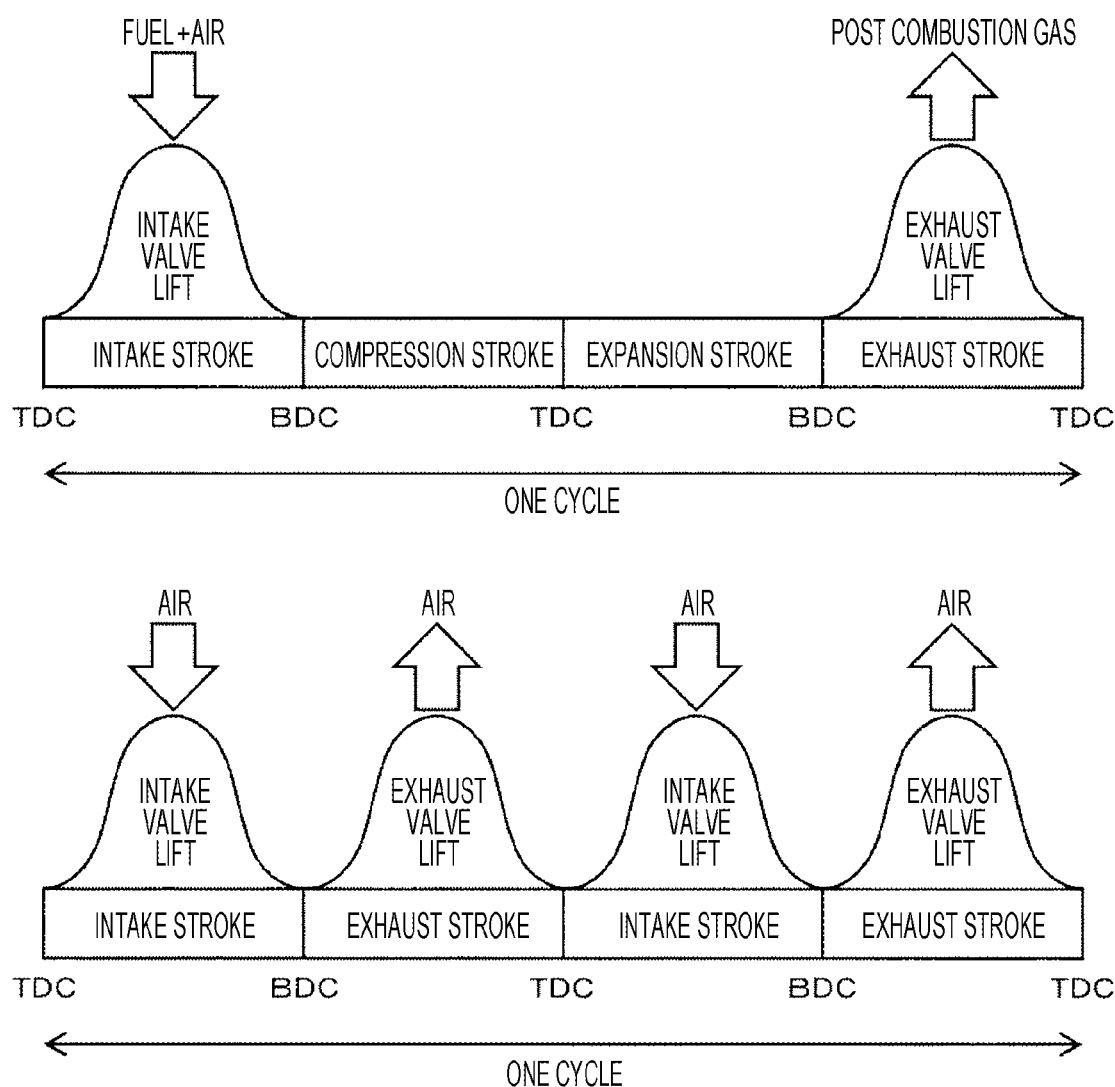
FIG. 4 is a diagram showing an example of the relationship between each of strokes and each of intake and exhaust timings in an engine system in which intake and exhaust strokes of an engine cylinder discharging air are performed twice in one cycle.

FIG. 4 is a diagram showing an example of the relationship between each of strokes and each of intake and exhaust timings when intake and exhaust strokes of an engine cylinder for discharging air are performed twice in one cycle. When air is introduced into cylinders 18 of some engine cylinders, and two strokes of intake and exhaust are repeated twice in one cycle in place of four strokes of intake, compression, expansion, and exhaust, the air is discharged to the exhaust pipe 27 in two exhaust strokes. Since one of the two exhaust strokes is performed simultaneously with the exhaust stroke of the engine cylinder in which the air-fuel mixture of fuel and air is introduced into the cylinder 18 and combusts, the post combusted gas 41 and the air are simultaneously discharged to the exhaust pipe 27.

Figure 5:
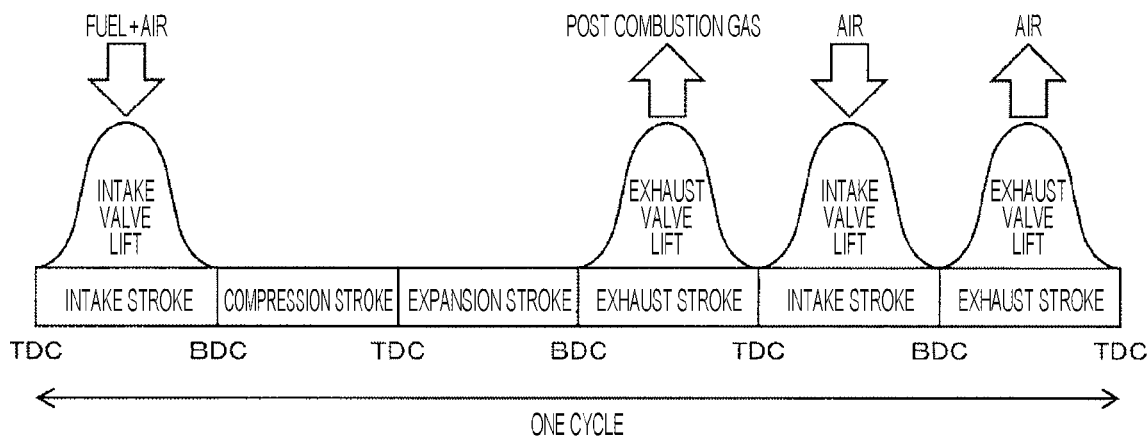
FIG. 5 is a diagram showing an example of the relationship between each of strokes and each of intake and exhaust timings in an engine system in which one cycle includes six strokes.

FIG. 5 is a diagram showing the timings of intake and exhaust when one cycle includes six strokes. When the air-fuel mixture of fuel and air is introduced into the cylinder 18 for some or all of the cylinder engines to perform four strokes of intake, compression, expansion, and exhaust, and air is then introduced into the cylinder 18 to provide six strokes in which intake and exhaust are performed, the post combusted gas 41 or the air is discharged to the exhaust pipe 27. When the post combusted gas 41 and the air are mixed in the exhaust pipe 27, a gas having a higher proportion of air than that of only the post combusted gas 41, that is, a higher $O_2$ concentration can be supplied as the catalyst inflow gas 42 to the exhaust gas purification catalyst 11.

Figure 6:
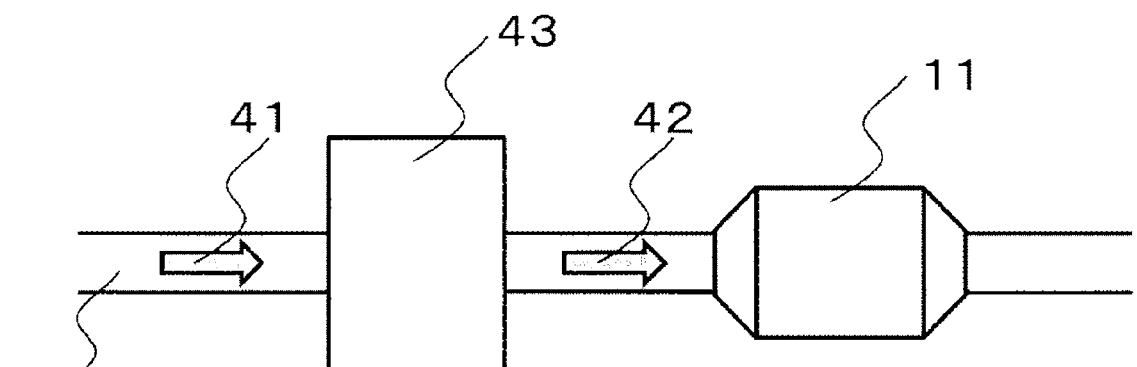
FIG. 6 is a diagram showing an example of an engine system including a device for increasing an oxygen concentration.

FIG. 6 is a diagram showing an example of an engine system including a device for increasing an $O_2$ concentration in addition to the engine system shown in FIG. 2. The $O_2$ concentration of the catalyst inflow gas 42 can be made higher than the $O_2$ concentration of the post combusted gas 41 by adding a gas containing $O_2$ using an $O_2$ concentration increasing device 43 to the post combusted gas 41 discharged to the exhaust pipe 27.

As the $O_2$ concentration increasing device 43, a secondary air introducing device can be used. The air is introduced into the exhaust pipe 27 by the secondary air introduction device to mix the air with the post combusted gas 41, whereby a gas having a higher proportion of air than that of only the post combusted gas 41, that is, a higher $O_2$ concentration can be supplied as the catalyst inflow gas 42 to the exhaust gas purification catalyst 11. A supercharger may be used to introduce the air into the exhaust pipe 27. The use of the supercharger make it possible to introduce the air even when the pressure in the exhaust pipe 27 is high.

When the O2 concentration increasing device 43 includes an O2 storage material 44, the O2 storage material 44 can store O2 contained in the gas flowing into the O2 concentration increasing device 43. By appropriately controlling a temperature at which the O2 storage material stores and releases O2, the O2 in the air flowing into the 02 concentration increasing device 43 is stored in the 02 storage material at the time of fuel cut. By causing the post combusted gas 41 discharged to the exhaust pipe 27 to flow into the O2 storage material to raise the temperature of the O2 storage material, the O2 is released. That is, a gas having an O2 concentration higher than that of only the post combusted gas 41 can be supplied as the catalyst inflow gas 42 to the exhaust gas purification catalyst 11.

The exhaust gas purification performance of the exhaust gas purification catalyst 11 can be further improved by using an ozonizer 45 in addition to the system for making the O2 concentration of the catalyst inflow gas 42 higher than the O2 concentration of the post combusted gas 41. When a gas containing O2 is circulated to the ozonizer 45, ozone is generated from the O2. Therefore, the ozone is added to the catalyst inflow gas 42 flowing into the exhaust gas purification catalyst 11 by providing the ozonizer 45 at the front stage of the exhaust gas purification catalyst 11. Since ozone is more oxidative than O2, an NO oxidation reaction by ozone is more likely to proceed than an NO oxidation reaction by O2 shown in Formula (1), whereby NOx is easily purified by Formula (2). In order to increase the generated amount of ozone, it is necessary to increase the O2 concentration of the gas flowing into the ozonizer 45, but in that case, any method described above may be used as a method for increasing the O2 concentration.

The method for making the $O_2$ concentration of the catalyst inflow gas 42 described above higher than the $O_2$ concentration of the post combusted gas 41 may be a combination of a plurality of methods, whereby the $O_2$ concentration of the catalyst inflow gas 42 can be further increased. In the above description, the air is used as the gas containing $O_2$, but even when other gas containing $O_2$ is used in place of the air, the $O_2$ concentration of the catalyst inflow gas 42 can be made higher than the $O_2$ concentration of the post combusted gas 41 in the same manner as above.

When the temperature of the catalyst inflow gas 42 flowing into the exhaust gas purification catalyst 11 is controlled to a temperature at which the exhaust gas purification activity becomes maximum in addition to the method for increasing the $O_2$ concentration, exhaust gas components including NOx can be more highly purified.

The method for increasing the $O_2$ concentration described above can also be used only when the exhaust gas component from the engine is increased. In this case, the exhaust gas purification activity can be improved while a decrease in engine output is suppressed. When the discharge amount of exhaust gas component with respect to the operating condition of the engine is confirmed in advance, and it is determined that the exhaust gas component is increased under a certain operating condition, a method for increasing the $O_2$ concentration can be used. By providing an NOx sensor detecting the NOx concentration of the post combusted gas 41 or the catalyst inflow gas 42, a method for increasing the $O_2$ concentration can be used when an increase in the NOx concentration is detected.

Hereinafter, the present invention will be described by way of specific examples, but the present invention is not limited by these examples.

EXAMPLE 1

A slurry containing an $Al_2O_3$ powder and an $Al_2O_3$ precursor and adjusted to acidify nitric acid
was coated on a cordierite honeycomb (400 cells/inc$_2$), and then dried and fired to obtain an $Al_2O_3$-coated honeycomb on which 170 g of $Al_2O_3$ is coated per liter of the apparent volume of the honeycomb. The $Al_2O_3$-coated honeycomb was impregnated with a Ga nitrate solution as a catalyst component, dried at 120° C., and subsequently fired at 600° C. for 1 hour.

As described above, an example catalyst 1 was obtained, which contained 170 g of $Al_2O_3$ with respect to a honeycomb 1 L and 10% by weight of Ga in terms of element with respect to $Al_2O_3$.

The obtained catalyst was subjected to an exhaust gas purification performance test under the following conditions. A honeycomb catalyst having a volume of 6 cc was fixed in a quartz glass reaction tube. The reaction tube was introduced into an electric furnace, and heating was controlled so that the temperature of a gas introduced into the reaction tube was set to 400, 450, and 500° C. Into the reaction tube, a model gas assuming an exhaust gas when an engine of an automobile was subjected to lean burn operation was introduced at a space velocity of 30,000 $h_{-1}$. The composition of the model gas had NOx: 150 ppm, $C_3H_6$: 250 ppm, $O_2$: 0.5, 3, 5, 10, 20, 25, 30%, $H_2O$: 2.8%, and $N_2$: residual. At this time, a NOx purification rate and a $C_3H_6$ purification rate were calculated according to the following formulae.

NOx purification rate(%)=(amount of NOx flowing into catalyst−amount of NOx flowing out of catalyst)/amount of NOx flowing into catalyst× 100    Formula (4)

$C_3H_6$ purification rate(%)=(amount of $C_3H_6$ flowing into catalyst−amount of $C_3H_6$ flowing out of catalyst) /amount of $C_3H_6$ flowing into catalyst× 100    Formula (5)

EXAMPLE 2

An example catalyst 2 containing 10% by weight of Ga and 0.61% by weight of Rh in terms of element with respect to $Al_2O_3$ was obtained by the same operation as in Example 1 except that an Rh nitrate solution was used in addition to a Ga nitrate solution as an impregnated component. The obtained catalyst was subjected to an exhaust gas purification performance test in the same manner as in Example 1.

COMPARATIVE EXAMPLE 1

A comparative example catalyst 1 containing 0.61% by weight of Rh in terms of element with respect to $Al_2O_3$ was obtained by the same operation as Example 1 except that an Rh nitrate solution was used in place of a Ga nitrate solution as an impregnated component. The obtained catalyst was subjected to an exhaust gas purification performance test with the $O_2$ concentration of a model gas set to 3 and 10% in the same manner as in Example 1.

(Test Results)

Figure 7:
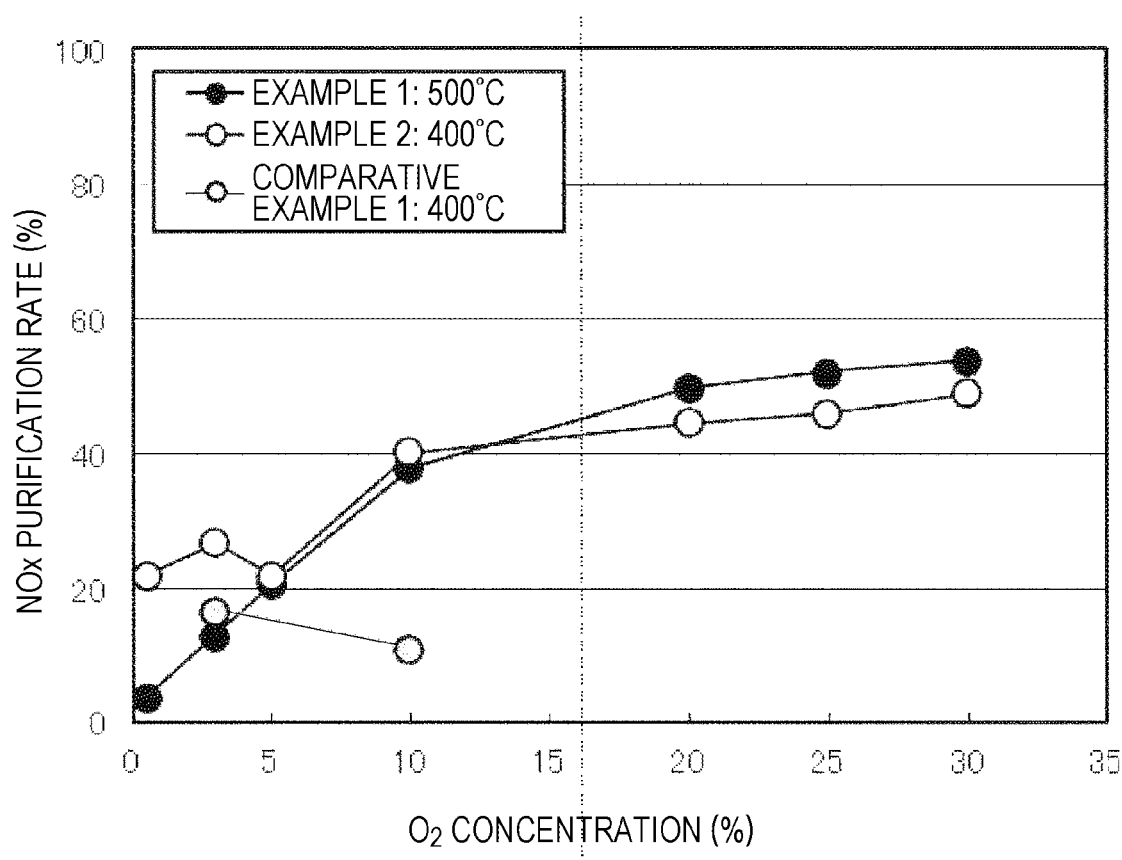
FIG. 7 is a graph showing the relationship between an oxygen concentration and the NOx purification activity of a catalyst.

The results of the NOx purification rates of the example catalysts 1 and 2 and the comparative example catalyst 1 are shown in Tables 1 to 3 and FIG. 7. When the $O_2$ concentration of a catalyst inflow gas is increased in the example catalysts 1 and 2, NOx purification activity is enhanced. Meanwhile, when the $O_2$ concentration is increased in the comparative example catalyst 1, the activity is decreased. From the above results, it can be seen that, in the example catalysts 1 and 2 containing Ga as a catalytically active component, the NOx purification activity is improved by the increase of the $O_2$ concentration. The reason is considered to be that the oxidation reaction of from NO to $NO_2$ by $O_2$ is promoted, and the purification reaction of the $NO_2$ by $C_3H_6$ is promoted.

In addition to the $O_2$ concentration of the catalyst inflow gas, the temperature of the catalyst inflow gas is controlled to 500° C. for the example catalyst 1, and 400° C. for the example catalyst 2, whereby the NOx purification activity is further enhanced.

TABLE 1

NOx purification rate at 400 to 500° C. of example catalyst 1

| $O_2$ concentration | NOx purification rate (%) | | |
|---|---|---|---|
| (%) | 400° C. | 450° C. | 500° C. |
| 0.5 | 1.2 | 1.6 | 3.8 |
| 3 | 3.2 | 4.8 | 13.1 |
| 5 | 4.9 | 4.6 | 20.5 |
| 10 | 3.0 | 6.6 | 37.8 |
| 20 | 13.7 | 43.7 | 49.8 |
| 25 | 29.8 | 46.5 | 52.4 |
| 30 | 27.7 | 48.2 | 53.9 |

TABLE 2

NOx purification rate at 400 to 500° C. of example catalyst 2

| $O_2$ concentration | NOx purification rate (%) | | |
|---|---|---|---|
| (%) | 400° C. | 450° C. | 500° C. |
| 0.5 | 21.8 | 37.2 | 9.2 |
| 3 | 26.7 | 37.7 | 22.0 |
| 5 | 22.0 | 35.9 | 16.8 |
| 10 | 40.2 | 37.3 | 16.8 |
| 20 | 44.6 | 30.0 | 18.4 |
| 25 | 46.1 | 39.6 | 22.7 |
| 30 | 49.0 | 36.9 | 26.8 |

TABLE 3

NOx purification rate at 400 to 500° C. of comparative example catalyst 1

| $O_2$ concentration | NOx purification rate (%) | | |
|---|---|---|---|
| (%) | 400° C. | 450° C. | 500° C. |
| 3 | 16.8 | 12.6 | 8.4 |
| 10 | 11.3 | 9.2 | 7.3 |

Figure 8:
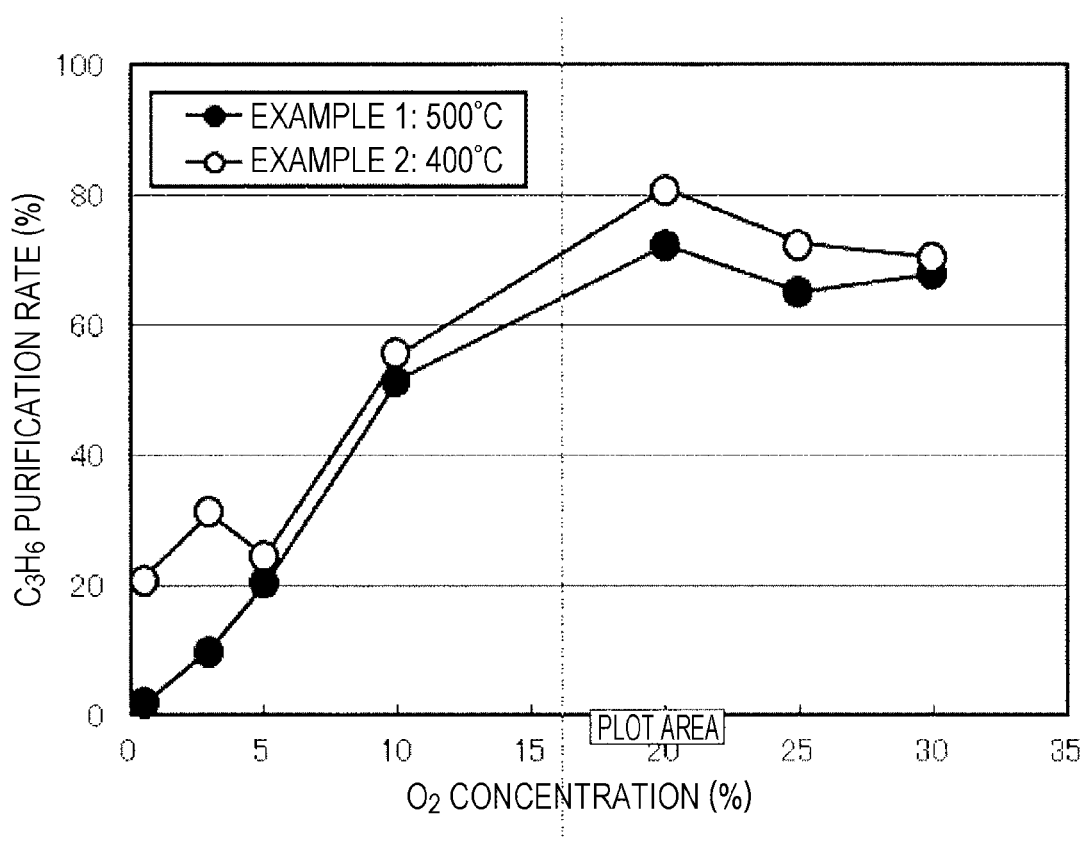
FIG. 8 is a graph showing the relationship between an oxygen concentration and the $C_3H_6$ purification activity of a catalyst.

The results of the $C_3H_6$ purification rates of the example catalysts 1 and 2 are shown in Tables 4, 5 and FIG. 8. According to Tables 4 and 5 and FIG. 8, when the concentration of $O_2$ flowing into the catalyst is increased, the $C_3H_6$ purification activity is enhanced. That is, it can be seen that, when the $O_2$ concentration is increased, not only the NOx purification activity but also the $C_3H_6$ purification activity is improved.

TABLE 4

$C_3H_6$ purification rate at 400 to 500° C. of example catalyst 1

| $O_2$ concentration | NOx purification rate (%) | | |
|---|---|---|---|
| (%) | 400° C. | 450° C. | 500° C. |
| 0.5 | <0.1 | <0.1 | 1.6 |
| 3 | <0.1 | 0.3 | 10.0 |
| 5 | <0.1 | 0.9 | 19.9 |
| 10 | <0.1 | 3.8 | 51.6 |
| 20 | 22.0 | 59.9 | 72.4 |
| 25 | 24.5 | 55.3 | 65.1 |
| 30 | 12.5 | 53.2 | 67.9 |

TABLE 5

$C_3H_6$ purification rate at 400 to 500° C. of example catalyst 2

| $O_2$ concentration | NOx purification rate (%) | | |
|---|---|---|---|
| (%) | 400° C. | 450° C. | 500° C. |
| 0.5 | 21.0 | 85.1 | 95.8 |
| 3 | 31.0 | 75.4 | 87.7 |
| 5 | 24.3 | 80.9 | 93.0 |
| 10 | 55.5 | 89.7 | 95.3 |
| 20 | 81.0 | 92.1 | 95.7 |
| 25 | 72.6 | 89.5 | 95.9 |
| 30 | 70.4 | 93.9 | 95.9 |

EXAMPLE 3

In an engine system shown in FIG. 2, an air-fuel ratio is controlled to a high value by an ECU 28, whereby the ratio of air in an air-fuel mixture of fuel and air introduced into a cylinder 18, that is, an $O_2$ concentration can be increased. Therefore, when an exhaust gas purification catalyst 11 of the system includes an example catalyst 1, exhaust gas purification activity is improved.

EXAMPLE 4

In an engine system shown in FIG. 2, an intake valve 23 and an exhaust valve 24 are simultaneously opened to introduce air into cylinders 18 of some cylinder engines. A post combusted gas 41 and the air are mixed in an exhaust pipe 27, whereby the $O_2$ concentration of a catalyst inflow gas 42 can be increased. Therefore, when an exhaust gas purification catalyst of the system includes an example catalyst 1, exhaust gas purification activity is improved.

EXAMPLE 5

In an engine system shown in FIG. 2, only an intake valve 23 is opened to introduce air into a cylinder 18, and an exhaust valve 24 is then opened to discharge the air to an exhaust pipe 27. By mixing a post combusted gas 41 with the air in the exhaust pipe 27, the $O_2$ concentration of a catalyst inflow gas 42 can be increased. Therefore, when an exhaust gas purification catalyst 11 of the system includes an example catalyst 1, exhaust gas purification activity is improved.

EXAMPLE 6

In an engine system shown in FIGS. 2 and 3, the intake and exhaust timings of a cylinder engine B introducing air into a cylinder 18 are changed to those of a cylinder engine B', whereby a post combusted gas 41 and air can be simultaneously discharged to an exhaust pipe 27. Therefore, the post combusted gas 41 and the air are easily mixed in the exhaust pipe 27, and the $O_2$ concentration of a catalyst inflow gas 42 can be efficiently increased, whereby, when an exhaust gas purification catalyst 11 of the system includes an example catalyst 1, exhaust gas purification activity is improved.

EXAMPLE 7

In an engine system shown in FIGS. 2 and 4, air is introduced into cylinders 18 of some cylinder engines, and two strokes of intake and exhaust are repeated twice in one cycle in place of four strokes of intake, compression, expansion, and exhaust, whereby a post combusted gas 41 and air can be simultaneously discharged to an exhaust pipe 27. Therefore, the post combusted gas 41 and the air are easily mixed in the exhaust pipe 27, and the $O_2$ concentration of a catalyst inflow gas 42 can be efficiently increased, whereby, when an exhaust gas purification catalyst 11 of the system includes an example catalyst 1, exhaust gas purification activity is improved.

EXAMPLE 8

In an engine system shown in FIGS. 2 and 5, an air-fuel mixture of fuel and air is introduced into cylinders 18 of some or all of cylinder engines to perform four strokes of intake, compression, expansion, and exhaust, and air is then introduced into the cylinder 18 to perform intake and exhaust, thereby providing six strokes are performed. The $O_2$ concentration of a catalyst inflow gas 42 can be increased by mixing a post combusted gas with the air in an exhaust pipe 27. Therefore, when an exhaust gas purification catalyst 11 of the system includes an example catalyst 1, exhaust gas purification activity is improved.

EXAMPLE 9

In an engine system shown in FIGS. 2 and 6, a secondary air introducing device is used as an $O_2$ concentration increasing device 43, and air is introduced into an exhaust pipe 27 and mixed with a post combusted gas 41, whereby the $O_2$ concentration of a catalyst inflow gas 42 can be increased. Therefore, when an exhaust gas purification catalyst 11 of the system includes an example catalyst 1, exhaust gas purification activity is improved.

EXAMPLE 10

In Example 9, by using a supercharger, the $O_2$ concentration of a catalyst inflow gas 42 can be increased even if a pressure in an exhaust pipe 27 is high.

EXAMPLE 11

In an engine system shown in FIGS. 2 and 6, an $O_2$ concentration increasing device 43 includes an $O_2$ storage material, and the $O_2$ storage material stores $O_2$ in air flowing into the $O_2$ concentration increasing device 43 at the time of fuel cut. By releasing $O_2$ from the $O_2$ storage material when a post combusted gas 41 inflows, the $O_2$ concentration of a catalyst inflow gas 42 can be increased. Therefore, when an exhaust gas purification catalyst 11 of the system includes an example catalyst 1, exhaust gas purification activity is improved.

EXAMPLE 12

In Example 4, when an ozonizer is provided at the front stage of an exhaust gas purification catalyst 11, ozone can be generated from $O_2$, and added to a catalyst inflow gas 42. In addition, the ozone concentration of a catalyst inflow gas 42 can be increased. Since ozone is more oxidative than $O_2$, exhaust gas purification activity is further improved.

EXAMPLE 13

In an engine system shown in FIG. 2, when an exhaust gas purification catalyst 11 includes an example catalyst 1, and a system for controlling the $O_2$ concentration and temperature of a catalyst inflow gas 42 is provided, a state where the $O_2$ concentration and temperature of the catalyst inflow gas 42 are 5% and 400° C., respectively, can be changed to a state where the concentration and the temperature are 20% and 500° C., respectively, whereby a NOx purification rate is improved to 49.8% from 4.9% as can be seen from Table 1.

While the embodiments of the present invention have been described above in detail, the present invention is not limited to the embodiments, and various changes in design can be made within a range that does not deviate from the spirit of the present invention described in the claims. For example, the embodiments described above have been described in detail to clearly explain the present invention, and the present invention is not limited to those having the entire configurations described above. A part of the configuration of an embodiment is replaceable with a part of the configuration of another embodiment, and a part of the configuration of an embodiment can be added to a part of the configuration of another embodiment. Further, with respect to a part of the configuration of each embodiment, addition, deletion, and replacement of another configuration can be made.

REFERENCE SIGNS LIST

1 first catalyst
2 second catalyst
3 carrier
4 substrate
11 exhaust gas purification catalyst
12 air flow sensor
13 supercharger
13a compressor
13b turbine
14 intercooler
15 intake pipe
16 electronically controlled throttle
17 intake pressure sensor
18 cylinder
19 injector
20 piston
21 ignition plug
22 valve timing mechanism
23 intake valve
24 exhaust valve
25 wastegate valve
26 air-fuel ratio sensor
27 exhaust pipe
28 ECU
29 accelerator opening sensor
30 EGR pipe
31 EGR cooler
32 EGR valve
33 differential pressure sensor
34 EGR temperature sensor
41 post combusted gas
42 catalyst inflow gas
43 $O_2$ concentration increasing device

The invention claimed is:

1. An exhaust gas purification system comprising:
   a carrier containing aluminum oxide; an exhaust gas purification device including a first catalyst and a second catalyst provided on the carrier and connected to an internal combustion engine;
   wherein the first catalyst contains gallium; and
   a system for increasing an oxygen concentration including an $O_2$ storage material, being connected to the exhaust gas purification device and provided downstream of the internal combustion engine;
   wherein the system for increasing an oxygen concentration provides an oxygen concentration higher than that of a post combusted gas of the internal combustion engine; and
   wherein a quantity of the first catalyst is 0.5 to 20% by weight with respect to the aluminum oxide contained in the carrier.

2. The exhaust gas purification system according to claim 1, wherein the second catalyst further contains rhodium.

3. The exhaust gas purification system according to claim 1, wherein the system for increasing an oxygen concentration sets an oxygen concentration of a gas flowing into the catalyst to 0.5% or more.

4. The exhaust gas purification system according to claim 1, wherein the system for increasing an oxygen concentration supplies a gas containing oxygen to the first catalyst separately from an exhaust gas discharged from the internal combustion engine.

5. The exhaust gas purification system according to claim 4, wherein the system for increasing an oxygen concentration includes a supercharger.

6. The exhaust gas purification system according to claim 1, wherein the internal combustion engine includes at least one engine cylinder which does not cause fuel to combust.

7. The exhaust gas purification system according to claim 1, wherein the internal combustion engine includes an intake stroke in which aft is circulated after a combustion stroke to perform intake, and an exhaust stroke immediately after the intake stroke.

8. The exhaust gas purification system according to claim 1, wherein the exhaust gas purification device includes an ozonizer for adding ozone.

9. The exhaust gas purification system according to claim 1, wherein the exhaust gas purification system further includes an ECU controlling an internal combustion engine operating condition and receiving a temperature of the post combusted gas of the internal combustion engine.

10. The exhaust gas purification system according to claim 1,
    wherein the second catalyst of the exhaust gas purification device contains rhodium; and wherein a quantity of the second catalyst is 2% by weight or less with respect to the aluminum oxide contained in the carrier.

* * * * *